UNITED STATES PATENT OFFICE.

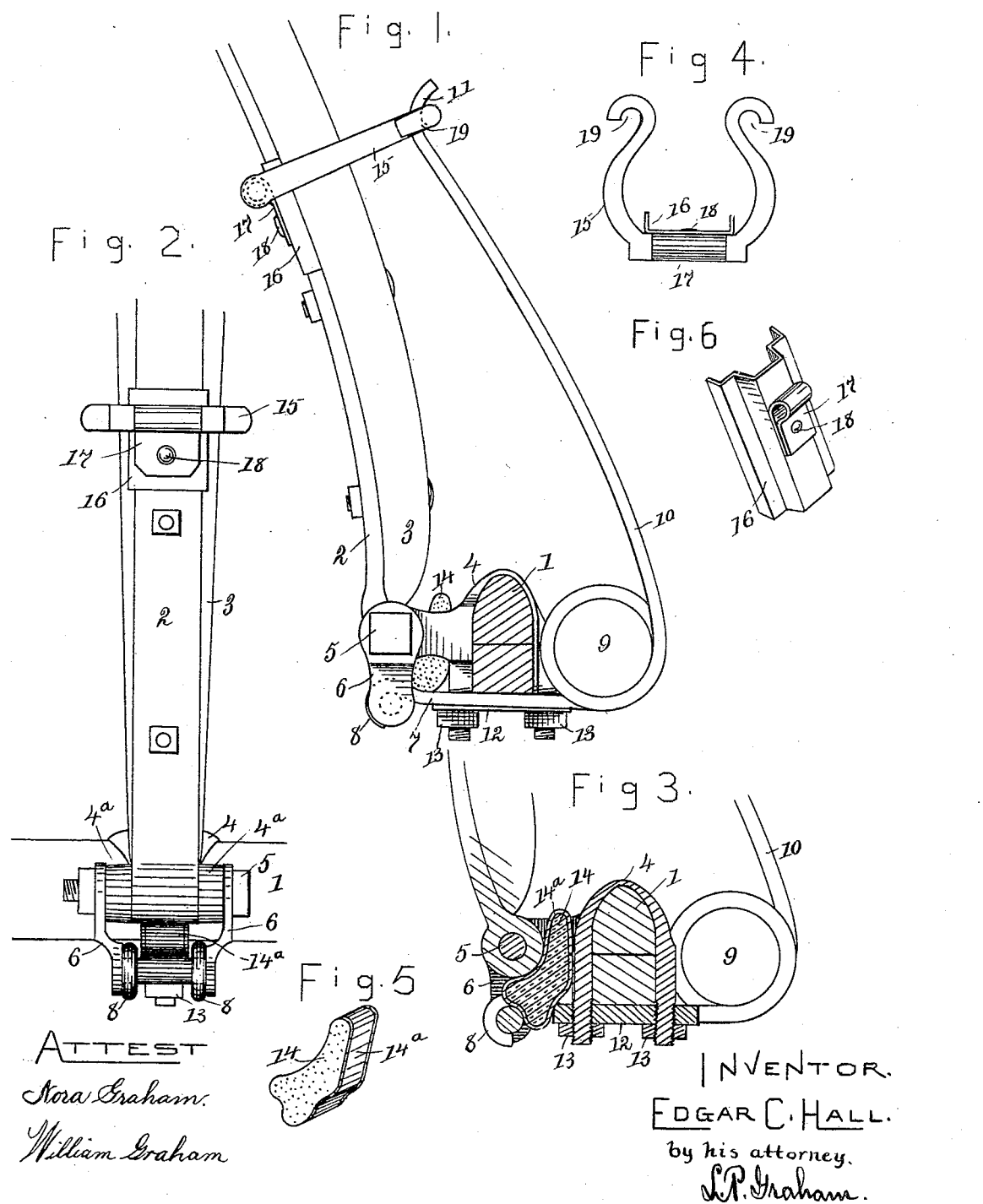

EDGAR C. HALL, OF DECATUR, ILLINOIS, ASSIGNOR OF ONE-HALF TO ALICE SHELLABARGER HALL, OF TOLEDO, OHIO.

COMBINED ANTIRATTLER AND SHAFT-SUPPORT.

SPECIFICATION forming part of Letters Patent No. 529,327, dated November 13, 1894.

Application filed August 13, 1894. Serial No. 520,116. (No model.)

*To all whom it may concern:*

Be it known that I, EDGAR C. HALL, of Decatur, in the county of Macon and State of Illinois, have invented certain new and useful Improvements in a Combined Antirattler and Shaft-Support, of which the following is a specification.

This invention is exemplified in the structure hereinafter described, it is defined in the appended claims and its purposes and advantages are developed throughout the specification.

In the drawings forming part of this specification Figure 1 is a side elevation of a shaft support and anti-rattler constructed in accordance with my invention. Fig. 2 is a front elevation of the same. Fig. 3 is a central vertical section through the device from front to back. Fig. 4 is a plan of the clip used to connect the supporting springs with the shaft. Fig. 5 is a perspective representation of the preferred form of anti-rattler. Fig. 6 shows a modified form of shaft slide.

The axle 1, the shaft iron 2, the shaft 3, and the axle clip 4 with its lugs 4ª, cross bar 12 and nuts 13 are of the usual, or any desired, conformation.

A bail 6 is swung onto the bolt 5, which connects the shaft iron with the lugs of the axle clip, and such swinging bail is an important feature of my invention, inasmuch as its cross bar affords points of connection for the shaft-supporting springs and holds the anti-rattler in place. Each shaft is supported by a pair of springs, and each spring is formed substantially as shown in Fig. 1, where 7 indicates a horizontal extension resting against the under side of the axle. 8 indicates a hooked end that embraces an end of the cross bar of the swinging bail. 9 is a coil designed to furnish the greater part of the requisite elasticity. 10 is an upward extension, and 11 is a hooked end adapted to engage a hook, 19, of clip 15.

At 16 is seen a slide bearing having flanged sides adapted to embrace the sides of the shaft iron. The plate 17 is pivotally connected with slide 16, by means of rivet 18, and it also engages, or is bent around, the round cross bar of clip 15.

The anti-rattler is preferably a block of hard rubber, *i. e.*, rubber sufficiently hard to develop the elastic pressure usually required of such devices, and its contour is substantially as represented at 14. Its faces are recessed to receive a bearing strip 14ª, which is made of metal, and which protects the rubber from frictional wear.

The anti-rattler is forced between the eye of the shaft iron and the opposing wall of the axle clip, as is clearly shown in Fig. 3. The bail 6 is swung rearward until its cross bar engages the lower, front surface of the anti-rattler block. The hooked ends, 8, of the supporting-springs are caught around the cross bar of the bail, on opposite sides of the block, the springs are swung upward until the coils engage the rear side of the axle and extension 7 rests against the under side, and the hooked ends 11 are made to engage the hooks 19 of clip 15.

In operation, the anti-rattler holds the shaft eye against rattling, and its elasticity compensates for wear in the eye or the bolt thereof. The bail holds the anti-rattler in place, and the springs hold the bail against the anti-rattler. The clip 15 connects the supporting springs with the shaft, the slide 16 acts only on the shaft iron and the clip is sufficiently wide to clear the shaft. The pivotal connection between the slide and plate 17 permits the shaft and the springs to spring out of line without cramping the slide on the iron.

As a result of the described peculiarities of the device, a cheap and desirable anti-rattler may be employed and held securely to its work, the shafts may be raised and lowered to any desired extent, and the connection between the springs and the shaft will run freely along the shaft, under all circumstances, without scratching, or otherwise damaging the finish of the shafts.

It frequently occurs that the bolts used to secure the shaft irons to the shafts are in position to interfere with the free action of the slides, and this may be obviated by shaping the slide to ride over the bolt head, as indicated in Fig. 6 of the drawings.

Having thus described my invention, I claim as new and desire to secure by Letters Patent—

1. An anti-rattler and shaft support, comprising an elastic wedge between the shaft eye and clip wall, a bail swung on the shaft bolt and adapted to bear against the anti-rattler, and a shaft supporting spring, or springs, connected with the bail and adapted to hold the bail in contact with the anti-rattler, substantially as set forth.

2. In anti-rattlers and shaft supports, the combination with the shaft eye and axle clip, of anti-rattler 14 adapted to be inserted between the eye and a wall of the clip, the bail 6 swung on bolt 5 of the shaft eye and adapted to bear against the anti-rattler, and the shaft supporting springs connected at 8 with the bail and having coils 9 adapted to bear against the side of the axle opposite the bail and hold the bail in contact with the anti-rattler, substantially as set forth.

3. In shaft supports, the combination of shaft supporting springs, a slide adapted to the shaft iron, a plate connected pivotally with the slide, and a clip connected pivotally with the plate and adapted to connect with the supporting springs, substantially as set forth.

In testimony whereof I sign my name in the presence of two subscribing witnesses.

EDGAR C. HALL.

Attest:
J. C. HOSTETLER,
LEVI P. GRAHAM.